Patented June 2, 1925.

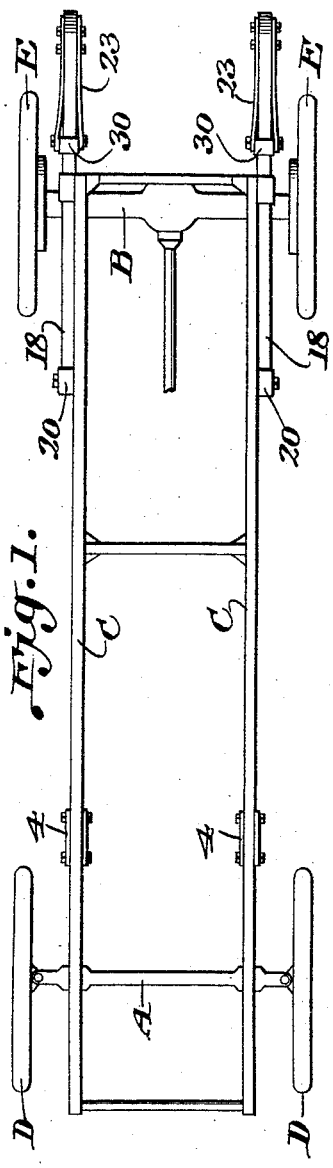
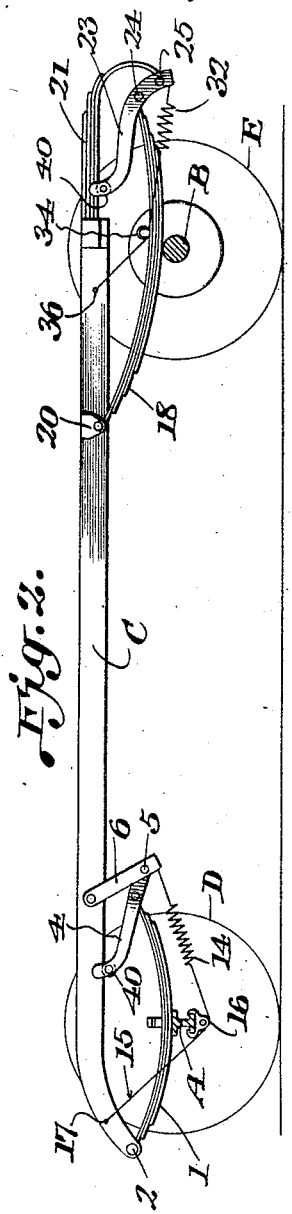
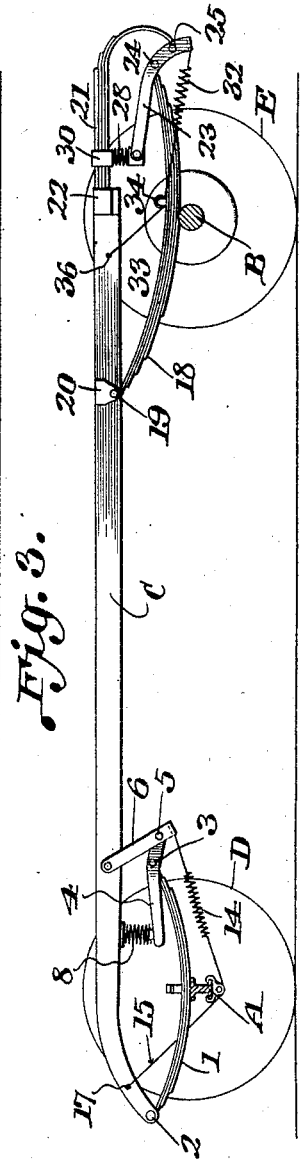

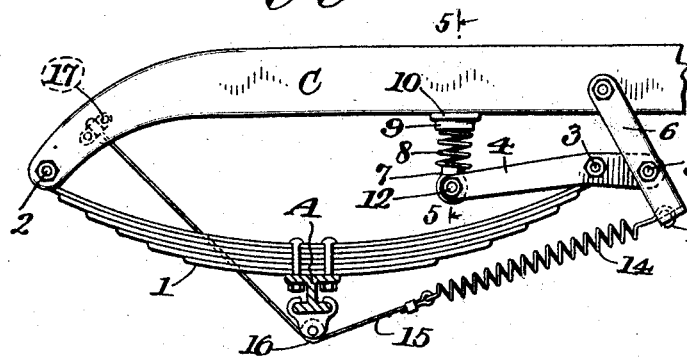
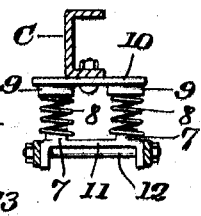
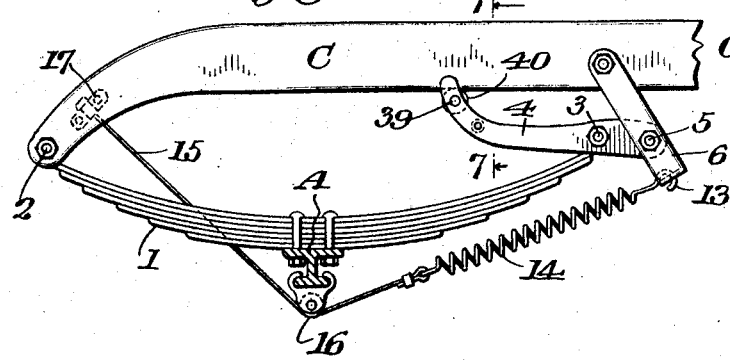
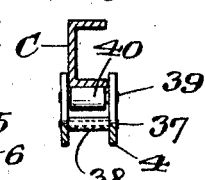
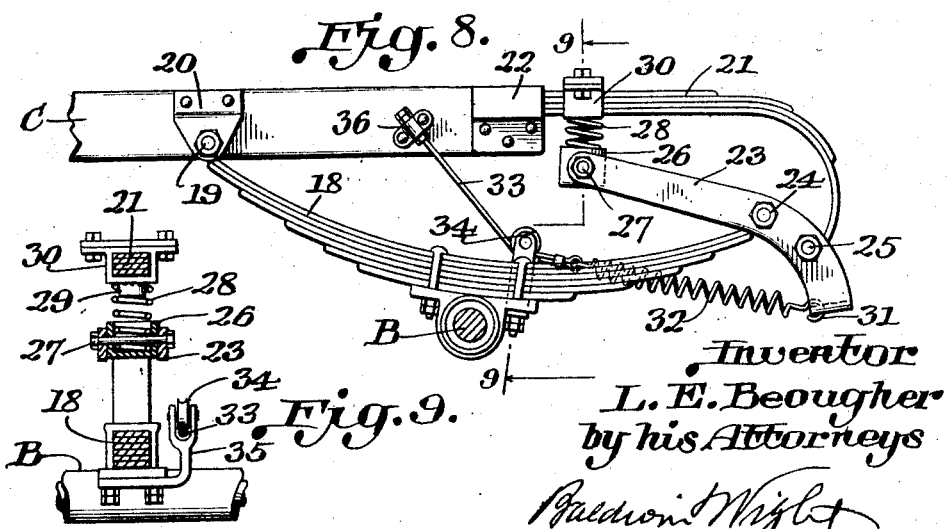

1,540,243

UNITED STATES PATENT OFFICE.

LAWRENCE E. BEOUGHER, OF McFARLAND, CALIFORNIA.

SHOCK ABSORBER.

Application filed July 21, 1924. Serial No. 727,211.

*To all whom it may concern:*

Be it known that I, LAWRENCE E. BEOUGHER, a citizen of the United States, and resident of McFarland, in the county of Kern and State of California, have invented certain new and useful Improvements in Shock Absorbers, of which the following is a specification.

The invention relates to shock absorbers of the type used on automobiles, and has for an object the provision of a simple and efficient shock absorber which will also function as a snubber and will take up rapid and uneven movement in either direction.

Another object is the provision of a structure which will be associated with the usual automobile springs and take up a portion of the shock that usually comes upon these springs and tends to break the same.

Further objects of the invention will be apparent from the following detailed description and the appended claims.

In the drawings:

Figure 1 is a top plan view of the chassis of an automobile with the invention applied thereto.

Figure 2 is a side elevation of the chassis with one form of the invention applied thereto.

Figure 3 is a side elevation illustrating a different form of the invention.

Figure 4 is a side elevation on an enlarged scale of the shock absorber on the front of the machine according to the form shown in Figure 3.

Figure 5 is a cross section on the line 5—5 of Figure 4.

Figure 6 is a view similar to Figure 4 but illustrating the form of invention shown in Figure 2.

Figure 7 is a cross section on the line 7—7 of Figure 6.

Figure 8 is a side elevation on an enlarged scale of the shock absorber on the rear of the machine according to the form shown in Figure 3.

Figure 9 is a cross section on the line 9—9 of Figure 8.

In the drawings there is illustrated diagrammatically the chassis of an automobile comprising front axle A, rear axle B, side frame bars C, front wheels D and rear wheels E. So far as the invention is concerned, these may be of any usual or desired type.

In the form of the invention illustrated in Figures 3, 4, 5, 8 and 9, the construction as applied to the front and rear ends differs slightly in one minor respect hereinafter pointed out, but in the main is the same. Referring to Figures 4 and 5, it will be seen that the usual semi-elliptical spring 1 is clamped to the axle A and pivoted at 2 to the front end of the side bar C. It is understood that the construction on the two sides of the vehicle are identical and only one is referred to in the description. The rear end of the spring 1 is pivotally connected by a bolt 3 to a lever in the form of a yoke 4 intermediate the ends thereof. The rear end of the yoke 4 is pivoted by a similar bolt 5 to a short link in the form of a yoke 6 which is pivoted at its upper end to the side bar C. The forward end of the yoke 4 is provided with two seats 7 upon which rest coil springs 8 the upper ends of which bear against similar seats 9 carried by a plate 10 fastened to the side bar C on its under side. The seats 7 are formed on a plate 11 pivotally mounted on a bolt 12 connecting the front end of the yoke 4.

The point of attachment of the yoke 4 to the yoke 6 is intermediate the ends of the latter, and the lower end of the yoke 6 has attached thereto as by a hook 13 one end of a coiled spring 14, the other end of which is fastened to a cord or wire cable 15 which runs around a pulley 16 fastened to the under side of the axle A and is attached at its forward end at 17 to the side bar C near its front end.

Referring to Figures 8 and 9, the construction of the shock absorber as applied to the rear end of the vehicle is seen to be as follows. The usual semi-elliptical spring 18 is carried by the axle B and pivoted at its front end at 19 to a bracket 20 carried by the side bar C. There is also provided a cantilever spring 21 similar to the spring 18 which is fastened at one end to the side bar C or a bracket carried thereby at 22 and extends outwardly and downwardly. The rear end of the spring 18 is connected to a lever in the form of a yoke 23 intermediate the ends thereof at 24. A little in the rear of this pivot point, the yoke 23 is pivoted to the lower end of the spring 21 at 25. The front and upper end of the yoke 23 has a cup shaped member 26 pivoted thereto by a bolt 27 and seated in this cup shaped member is a coil spring 28, the upper end of which rests on a seat 29 formed on a bracket 30 clamped to the spring 21.

Attached to the lower rear end of the yoke 23 as by a hook 31 is a coil spring 32, the other end of which is fastened to a cable 33 which runs under a pulley 34 carried by an arm 35 which may be fastened in place by the bolts usually employed for clamping the axle B to the spring 18, and said cable is finally attached to the side frame C and 36. The cantilever spring 21 constitutes in effect a continuation of the side frame member C and may be so considered in the claims.

It will be observed that a movement of the front axle and chassis toward each other will be resisted by the springs 1 and 8, while the rebound, or movement in the opposite direction will be resisted by the spring 14. Both shock and rebound will be lessened and all jars arising from any cause will be eliminated or greatly reduced.

In the modification shown in Fgures 2, 6 and 7, the construction is the same as that already described except that the springs 8 and cooperating parts are omitted. In place thereof the upper end of the yoke 4 is connected by a bolt 37 having a spacing washer 38 while on another bolt 39 is placed a freely revoluble roller 40 which runs on the under side of the chassis side bar C.

The same construction can be applied to the rear end of the vehicle, as shown in Figure 2. All other details of construction are the same in both forms. It is to be noted that double springs such as shown in Figure 5 or single springs such as shown in Figure 9, may be used at either or both ends of the vehicle, these forms being interchangeable as desired.

It is obvious that detailed changes can be made without in any way departing from the spirit of the invention which is to be regarded as limited only by the scope of the appended claims.

I claim as my invention:

1. In a vehicle having a side frame member and a spring carried by the axle and pivoted at one end to said member, the combination of a lever to an intermediate portion of which the other end of the spring is pivoted, a link pivoted to the side frame and to said lever, movable engaging means between the free end of said lever and the side frame, and a cable comprising a tension spring connected to the free end of said link, passing about a pulley carried by the axle and attached at its other end to the side frame.

2. In a vehicle having a side frame member and a spring carried by the axle and pivoted at one end to said member, the combination of a lever to an intermediate portion of which the other end of the spring is connected, means pivotally connecting said lever with the frame, movable engaging means between the free end of said lever and the frame, and a cable comprising a tension spring operatively connected to said lever, passing about a pulley carried by the axle and attached at its other end to the side frame.

3. In a vehicle having a side frame member and a spring carried by the axle and pivoted at one end to said frame member, the combination of a lever to an intermediate portion of which the other end of the spring is pivoted, means pivotally connecting the lever to the frame at one side of its connection with the spring, movable engaging means between the frame and the lever at the other side of its connection with the spring, and a cable comprising a tension spring operatively connected to the free end of said lever, passing around a pulley carried by the axle, and attached at its other end to the side frame.

In testimony whereof, I have hereunto subscribed my name.

LAWRENCE E. BEOUGHER.